April 21, 1959     W. SHUMATE     2,882,574
HOLDING JIG OR CLAMP
Filed July 26, 1955
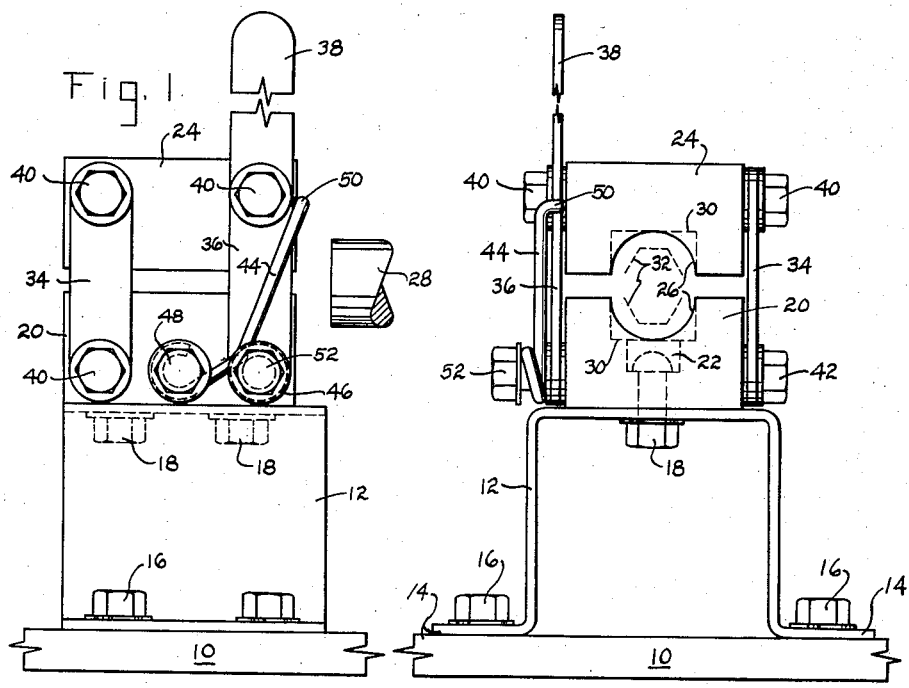
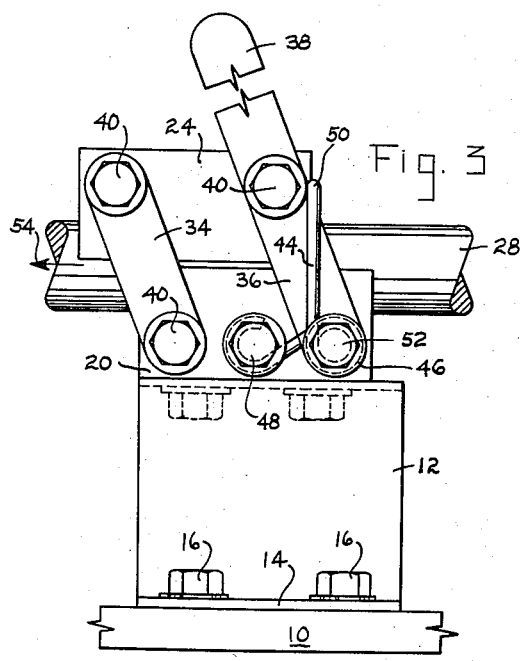
WILLIAM SHUMATE
*INVENTOR.*
BY *Hubert Miller*

United States Patent Office 2,882,574
Patented Apr. 21, 1959

2,882,574

HOLDING JIG OR CLAMP

William Shumate, Wichita, Kans., assignor to Boeing Airplane Company, Wichita, Kans., a corporation of Delaware Application July 26, 1955, Serial No. 524,471

1 Claim. (Cl. 24—132)

This invention relates broadly to clamping devices, and pertains more specifically to a clamp for holding rods, bars, pipes and the like during a work performing operation upon such an article.

Vises of many description have been employed in clamping such articles as rods and bars. For the most part, however, such holding devices have either required an appreciable amount of time in tightening and loosening the device, or the fixture has been so elaborate and complicated in its construction that its acceptance has been limited. Consequently, it is believed manifest that there remains a large demand for a clamping device capable of clamping elongated objects, such as those mentioned, in a rapid and facile manner. Coupled with the foregoing demand is the desideratum that such a device be of simple construction so that the cost thereof will be minimized. The structure comprehended by the present invention is eminently suited for use where a rapid clamping action is desired, and has for a further object the making of a device of the referred to character in an inexpensive manner.

The invention also has for an object an arrangement of parts such that an increased gripping action can be expected when the rod or similar item is forced in one direction.

A further aim of the invention is to provide a clamping device operable by spring action wherein the spring may be readily changed with another having a different spring constant. In this way, the jaw operation may be moderated so as to accommodate articles of soft metal or frangible articles such as glass rods or plastic tubes.

A further object of the invention is to provide a device of the type described which will clamp articles that may vary somewhat in size without having to adjust therefor. For instance, pipes of different diameters may be readily held, the spring actuated jaws automatically compensating for any such differences.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claim.

In the drawing:

Figure 1 is a side elevational view of a clamping device constructed in accordance with the teachings of the instant invention, the device being in a "release" position with the forward end of a rod about to be inserted;

Figure 2 is an end view of Figure 1, and

Figure 3 is another side elevational view, this view showing the device in a "clamping" position.

Referring now more particularly to the drawing, it will be observed that there is pictured a base 10 to which is mounted an upstanding U-shaped bracket 12 equipped with outwardly issuing flanges 14, each flange being apertured for the accommodation of anchoring bolts 16.

By means of a pair of additional bolts 18 extending through the bridging portion of the bracket 12 a jaw member 20 is retained in a fixed relation. From Figure 2 it can be seen that the drilled passage through which one of the bolts 18 extend is counterbored at 22 so that there can be no interference between the bolt head and any objects being clamped.

Cooperable with the fixed jaw member 20 is a second or movable jaw member 24. This latter member may be identical in size and shape with the former, thus helping in keeping fabrication costs at a low figure. Of course, passages like those utilized in receiving the bolts 18 need not be formed in the jaw member 24, inasmuch as they would serve no useful purpose here. It might be explained at this time that semi-circular grooves 26 are provided in the opposed faces of each jaw member. These grooves will of course be of prime utility in the clamping of cylindrical articles such as a rod 28, one end of which is shown in Figure 1 as it is about to be inserted between the jaw members and an intermediate portion of which is illustrated in a clamped condition in Figure 3. Obviously, the clamping faces of the jaw members 20 and 24 may be designed so as to conform to the precise shape of the article to be held. For example, these jaws may have rectangular grooves as indicated in phantom outline by the numeral 30, or they may produce a hexagonal configuration as indicated by the numeral 32. The particular configuration is not essential for a practicing of the invention.

The opposite sides of the jaw members 20 and 24 are flat and confronting these planar sides are a plurality of links. Three of these links are identical and those visible in the drawing have been designated by the reference numeral 34. The fourth link 36 is equipped with an integral extension 38, this extension serving as a handle by which the upper jaw member 24 may be moved into a position of disengagement. Pivot pins serve to connect operatively the jaw members together, three of these pins 40 being of a given length and the fourth pin 42 being slightly longer for a purpose presently to be made manifest. As is believed obvious all four pins extend completely through the jaw members.

The pin 42, owing to its extra length, affords a convenient anchorage for a heavy spring wire element 44. To this end the element 44 is formed with an intermediate loop 46. A bolt 48 has encircled thereabout one end of the spring element, while the other end of the spring is bent to provide an offset portion 50 engageable with the link 36. In effecting this engagement the spring element is first flexed by moving the offset end 50 in a clockwise direction, as viewed in Figure 1, thus setting up a strong spring action which constantly urges the jaw member 24 through an arcuate path into the clamping position depicted in Figure 3. The length of the handle 38 is such that the force stemming from the spring 44 may be easily overcome; that is, enough manual leverage may be applied to disengage the jaws whenever desired.

Ordinarily, one spring 44 will be all that is needed for a variety of clamping operations. However, it is envisaged that there may be times when a weaker biasing action is demanded, and with this thought in mind the pin 42 is provided with a removable nut 52. By also removing the bolt 48, it can be easily understood that the spring 44 can then be withdrawn so that a weaker spring may be substituted therefor. By so doing, the device may be readily adapted for the holding of articles that would otherwise be liable to become damaged or broken because of excessive clamping pressure.

From the foregoing it will be appreciated that the device is moved to the position illustrated in Figure 1 whenever an article is to be clamped. Release of the handle 38 permits the jaw 24 to grip automatically the exemplified article 28, the upper jaw 24 traversing an arcute path to whatever extent is necessary to accomplish the engagement. When so gripped, as will be understood from Figure 3, any force applied to the rod 28 which will tend to move the rod in the direction of the arrow 54 (Figure 3) will augment the clamping action supplied by the spring 44, thus affording greater resistance to removal of the rod in this direction. Rotating the handle 38 in a clockwise direction releases the rod. Consequently, without resort to threaded, time consuming adjustments and without utilizing a complicated mechanical arrangement, articles of the aforenoted type can be quickly gripped in a secure fashion so as to permit a work performing operation to be undertaken.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

What is claimed:

A quick action stationary vise for holding a tube-shaped member on which work is to be performed, comprising: a base secured to a fixed supporting surface, a fixed elongated block jaw mounted on the top of said base; a movable elongated block jaw superposed to said fixed block jaw, said block jaws having on adjacent faces aligned, matching central longitudinal grooves forming together confining jaw means for clamping said tube-shaped member, a pair of parallel upright links disposed at each side of said jaw members and pivot pins securing each link end to adjacent end portions of the sides of said block jaws whereby said movable block jaw may be swung in horizontal orientation from an upper position open to receive said tube-shaped member to a lower position to clamp the same, spring means comprising a spring wire having a loop intermediate its ends, said loop encircling one of said pivot pins and the ends of the wire being secured to and acting between a block jaw and a link to move the movable jaw to lower clamping position, said spring wire being removably attached to said pivot pin, block jaw and link so that spring wires can be interchanged in clamping stronger and weaker tubes, and handle means formed by an end portion of one of said links extending substantially beyond its point of pivotal connection to the adjacent block jaw, said handle means being manually operative to force said movable jaw to said upper position against the operation of said spring means.

References Cited in the file of this patent

UNITED STATES PATENTS

| | | |
|---|---|---|
| 858,018 | Petersen | June 25, 1907 |
| 1,111,878 | Carroll | Sept. 29, 1914 |
| 1,184,106 | Klein | May 23, 1916 |
| 1,320,600 | Bush | Nov. 4, 1919 |
| 1,561,224 | Fritsche | Nov. 10, 1925 |
| 1,591,525 | Gardner | July 6, 1926 |
| 1,710,697 | Gilbert | Apr. 30, 1929 |
| 1,736,290 | Schiff | Nov. 19, 1929 |
| 2,148,563 | Kingsley | Feb. 28, 1939 |
| 2,503,123 | Morlan | Apr. 4, 1950 |
| 2,582,097 | Blackwell | Jan. 8, 1952 |
| 2,679,379 | Peterson | May 25, 1954 |
| 2,793,065 | McCurry | May 21, 1957 |

FOREIGN PATENTS

| | | |
|---|---|---|
| 385,800 | Australia | Jan. 5, 1933 |